US012654265B2

(12) United States Patent (10) Patent No.: US 12,654,265 B2

Ibarra et al. (45) Date of Patent: Jun. 16, 2026

(54) MACHINE TOOL AND METHOD OF OPERATING THE MACHINE TOOL

(71) Applicant: ETXE-TAR, S.A., Elgoibar (ES)

(72) Inventors: Jorge Ibarra, Elgoibar (ES); Gabriel Moya, Elgoibar (ES)

(73) Assignee: ETXE-TAR, S.A., Elgoibar (ES)

( * ) Notice: Subject to any disclaimer, the term of this patent is extended or adjusted under 35 U.S.C. 154(b) by 0 days.

(21) Appl. No.: 18/863,533

(22) PCT Filed: May 9, 2023

(86) PCT No.: PCT/EP2023/062302

§ 371 (c)(1),
(2) Date: Nov. 6, 2024

(87) PCT Pub. No.: WO2023/217794

PCT Pub. Date: Nov. 16, 2023

(65) Prior Publication Data

US 2025/0345891 A1     Nov. 13, 2025

(30) Foreign Application Priority Data

May 10, 2022     (EP) .................................... 22382449

(51) Int. Cl.
B23Q 1/62          (2006.01)
B23Q 3/155          (2006.01)
                    (Continued)

(52) U.S. Cl.
CPC ......... B23Q 1/626 (2013.01); B23Q 3/15526 (2013.01); B23Q 11/08 (2013.01); B23Q 39/04 (2013.01); B23Q 2003/15537 (2016.11)

(58) Field of Classification Search
CPC .... B23Q 1/626; B23Q 3/15526; B23Q 11/08; B23Q 39/04; B23Q 2003/15537
See application file for complete search history.

(56) References Cited

U.S. PATENT DOCUMENTS

| | | | |
|---|---|---|---|
| 10,668,589 B2 * | 6/2020 | Ayestarán Lazcano | ..................... B23Q 39/028 |
| 11,247,303 B2 * | 2/2022 | Jeong ................. | B23Q 3/15786 |
| 2021/0060666 A1 | 3/2021 | Jeong | |

FOREIGN PATENT DOCUMENTS

| | | |
|---|---|---|
| DE | 10225143 A1 | 1/2004 |
| EP | 3715051 A2 | 9/2020 |

OTHER PUBLICATIONS

International Search Report for Application No. PCT/EP2023/062302, dated Jul. 27, 2023, 3 pages.

(Continued)

*Primary Examiner* — Victor L MacArthur

(74) *Attorney, Agent, or Firm* — CANTOR COLBURN LLP

(57)          ABSTRACT

A machine tool includes a tool assembly having a tool carrier support and a tool magazine. The tool assembly is displaceable in parallel with an X axis. The tool carrier support supports a tool carrier for driving a tool.

The tool magazine of the tool assembly is configured for supporting a number of tools. The tool magazine is attached to the tool carrier support for movement with the tool carrier support in parallel with the X axis.

The tool assembly includes a drive component configured for displacing the tool magazine in relation to the tool carrier support, between a first position in which the tool magazine is not facing the tool carrier, and a second position in which the tool magazine is facing the tool carrier, for allowing tool replacement.

20 Claims, 10 Drawing Sheets

(51) Int. Cl.
 B23Q 11/08 (2006.01)
 B23Q 39/04 (2006.01)

(56) References Cited

OTHER PUBLICATIONS

Written Opinion for Application No. PCT/EP2023/062302, dated
Jul. 27, 2023, 6 pages.

* cited by examiner

MACHINE TOOL AND METHOD OF OPERATING THE MACHINE TOOL

CROSS-REFERENCE TO RELATED APPLICATIONS

This application is a 35 U.S.C. § 371 National Stage patent application of PCT/EP2023/062302, filed on 9 May 2023, which claims the benefit of European patent application 22382449.1, filed on 10 May 2022, the disclosures of which are incorporated herein by reference in their entirety.

TECHNICAL FIELD

The present disclosure relates to a machine tool for carrying out machining operations such as drilling, boring, grinding, chamfering, milling, broaching, etc., on workpieces requiring machining at different positions, such as at different positions in an X-Y plane.

BACKGROUND

It is known in the art to machine components having a substantial extension along at least one axis, for example, along an X axis. Many structural components, for example, structural components for automotive vehicles such as cars and trucks, for aircraft, or for trains, require machining at multiple positions along and across the component. For example, beams to be used in automotive vehicles, aircraft or trains may have a substantial extension along at least one axis, for example, in the case of a beam or similar, along its longitudinal axis. An example of this kind of beams are the beams used for the so-called battery boxes that support, position and retain the batteries in electrical vehicles.

For machining workpieces having a substantial extension along at least one axis (such as an X axis), typically one or more tools have to be displaced in parallel with the X axis for interacting with the workpiece at different positions along the workpiece. In addition, the tools may have to be displaceable in parallel with at least another axis, such as in parallel with a Y axis, so as to be able to interact with the workpiece at different positions of the workpiece in the X-Y plane, that is, at different coordinates in the X-Y plane. Typically, the tools are arranged to be displaceable also in parallel with a Z axis so as to move towards or away from the workpiece. The X, Y and Z axes are typically orthogonal axes, each axis being perpendicular to the other two axes.

Each tool is typically arranged in a tool carrier that holds and drives the tool, for example, so as to rotate the tool, for example, around an axis parallel with the Z axis. In some machine tools, there are several tool carriers that interact with one workpiece during machining of the workpiece, and these tool carriers may be provided with tools adapted for the same or for different machining operations. In some machine tools there are several tool carriers that interact with different workpieces, for simultaneous machining of a plurality of workpieces.

Frequently, tool changes are performed during machining of the workpiece, whereby at least one tool carrier is displaced along the X axis to a tool magazine supporting a plurality of different tools, and interacts with the tool magazine so that the tool carried by the tool carrier is replaced by another tool. Sometimes, a tool carrier has to carry out more than one tool change before the machining of the workpiece in the machine tool is terminated.

Whereas automatic tool changes can be carried out rather rapidly in modern machine tools, tool changes still imply a certain downtime during which no machining operations are carried out by the respective tool carrier. Part of the downtime is due to the tool replacement operation itself, but another part is due to the time it takes for the tool carrier to move between the position where the last machining operation on the workpiece was carried out and the position of the tool magazine, and then back to the position where the next machining operation is to be carried out (with the new tool). If there are several tool changes, these displacements of the tool carrier to the tool magazine and back may sum up to a substantial amount of time. Even though tool carriers can move rapidly—for example, along the X axis-, it has been found that it would be desirable to enhance efficiency by further reducing the time needed for the entire tool change operation, including the downtime due to displacement of the tool carrier to the tool magazine and back.

It is also believed to be known in the art to provide a dedicated device, such as a robotic arm, to transfer tools between a tool carrier and a tool magazine. The incorporation of this kind of dedicate device may add complexity. Also, when several tool carriers (for example, a plurality of tool carriers arranged on one tool carrier support column for simultaneous machining of a respective plurality of workpieces) have to carry out a tool change, the dedicated device may have to carry out a series of subsequent tool changes before machining can be re-initiated, which may imply a substantial downtime. Alternatively, additional dedicated devices can be used, such as one dedicated device per tool carrier. This, however, may increase complexity and costs.

DE-10225143-A1 discloses a machine tool with a tool spindle for receiving a tool, a background magazine in which tools are stored, and a transfer device for transferring tools between the background magazine and a transfer position. The machine tool is also provided with a machine magazine for receiving tools, and from which tools can be exchanged with the tool spindle. The machine magazine is displaceable in parallel with a horizontal Y axis between a position for exchanging tools with the background magazine and a position for exchanging tools with the tool spindle.

US-2021/0060666-A1 discloses a machine tool with a rotatable tool magazine, which optionally is displaceable also along a horizontal axis.

SUMMARY

A first aspect of the disclosure relates to a machine tool comprising a workpiece support for supporting at least one workpiece for allowing machining of the workpiece. In some embodiments the workpiece support is designed for supporting elongate workpieces extending in parallel with an X axis of the machine tool, such as workpieces having a length of more then 1, 2 or 3 meters. The machine tool may be especially advantageous for the machining of elongate workpieces, such as metal workpieces, such as metal profiles or beams, for example, aluminium profiles or beams, for example, profiles or beams intended to form part of vehicles, such as of the battery box of electric vehicles. Such profiles or beams may have a substantial length, such as a length of more than 1, 1.5, 2 or 3 meters.

The workpiece support may include, for each workpiece, an elongate support member to which the respective workpiece can be clamped. The support member may be arranged so that it can pivot (for example, carrying out a full 360 degree rotation, or a more limited rotation such as a rotation by up to 270, 180 or 90 degrees) around an axis parallel with the X axis, for the purpose of setting a suitable angle of attack between workpiece and tool, and/or for transferring the workpiece from a position for loading and unloading the workpiece onto and from the workpiece support, respectively, to a position for machining the workpiece, in which the workpiece faces the respective tool so that the tool can carry out machining operations on the workpiece. In some embodiments, the elongate support member can be arranged between two columns, such as between two vertical columns, which may be spaced from each other by a distance of, for example, more than 1, 1.5, 2 or 3 meters. When there are several elongate support members, they may be arranged in parallel, one after the other along an axis parallel with a Y axis of the machine tool, such as one above the other when the Y axis is a vertical axis.

The machine tool further comprises a tool assembly comprising a tool carrier support and a tool magazine, the tool assembly being displaceable in parallel with an X axis. The X axis, which could also be referred to as a "first axis" of the system, can for example be horizontal or vertical. In some embodiments, the machine tool comprises more than one tool assembly displaceable in parallel with the X axis.

The tool carrier support supports a tool carrier (in many embodiments, more than one tool carrier), the tool carrier being configured for carrying and driving a tool (in some embodiments, more than one tool) for machining a workpiece supported by the workpiece support. For example, each tool carrier may include one or more spindles for rotating one or more tools, as known in the art. The tool carrier is supported on the tool carrier support (such as on a side of the tool carrier support) for movement with the tool carrier support in parallel with the X axis.

The tool magazine of the tool assembly is configured for supporting a plurality of tools. The tool magazine is attached to the tool carrier support for movement with the tool carrier support in parallel with the X axis.

The tool assembly comprises drive means for displacing the tool magazine in relation to the tool carrier support, between a first position in which the tool magazine is not facing the tool carrier, and a second position in which the tool magazine is facing the tool carrier, for allowing replacement of a tool carried by the tool carrier, by another tool supported by the tool magazine.

The term "facing" is to be interpreted in the sense that the tool magazine is placed in relation to the tool carrier in a manner that allows a tool change operation to be carried out, in which a tool previously carried by the tool carrier is replaced by a tool supported by the tool magazine. For example, in many embodiments the tool magazine "faces" the tool carrier by being placed in front of the tool carrier, for example, along a Z axis, which may correspond to the axis of rotation of the tool carried by the tool carrier. A tool carried by the tool carrier is typically held by a chuck or other retention means forming part of the tool carrier, in a way that allows tool drive means forming part of the tool carrier to transfer torque to the tool for rotating the tool for machining operations.

The fact that the tool magazine is attached to the respective tool carrier support for movement with the tool carrier support in parallel with the X axis implies that the tool magazine can remain positioned relatively close to the tool carrier or tool carriers irrespective of the position of the tool carrier or tool carriers and the tool carrier support along the X axis. This can serve to minimize the downtime corresponding to the relative displacement between the tool carrier and the tool magazine in correspondence with a tool change. For example, in many prior art machine tools the tool magazine is in a fixed position, typically not facing the workpiece but beyond the end of the workpiece, so depending on the position of the tool carrier along the X axis when a tool change operation is to be initiated, the tool carrier may have to travel a distance corresponding to a substantial portion of the length of the workpiece along the X axis, or even more. With a tool magazine attached to the tool carrier support so that it moves with the tool carrier support in parallel with the X axis, the amplitude of the relative movement (along the X axis) between the tool carrier and the tool magazine requested for a tool change operation can be substantially reduced and can remain the same independently of the position of the tool carrier in relation to the X axis when the tool change operation is to be initiated. This can obviously be especially advantageous in the case of workpieces that have a substantial extension along the X axis, such as an extension of more than one or two meters. On the other hand, the stroke of the tool magazine from the first position to the second position and back can be used as part of the tool change operation. In particular, in some embodiments, the tool magazine can be configured (for example, due to the configuration and arrangement of tool grippers forming part thereof) to more or less automatically engage a tool held by the tool carrier towards the end of the stroke, that is, when the tool magazine approaches its second position. Analogously, the tool magazine can be configured (for example, due to the configuration and arrangement of tool grippers forming part thereof) to release a tool that has become engaged by a tool carrier when the tool magazine moves away from its second position. Thus, the movement of the tool magazine from its first to its second position and back can serve not only to position the tool magazine in a suitable position for a tool change, but also to contribute to the engagement and release of tools by, for example, the tool grippers of the tool magazine. This can eliminate or reduce the need for an additional device dedicated to the transfer of the tools between tool magazine and tool carrier during a tool change operation.

The reference to, for example, "a tool assembly" and "a tool carrier" should not be interpreted to exclude the possibility of the machine tool comprising more than one tool assembly as described, and it should not exclude the possibility of the tool carrier support supporting more than one tool carrier. Actually, it may often be preferred that the tool carrier support supports two or more tool carriers arranged one after the other along a Y axis, for example, a vertical Y axis, so that the tool assembly can be used for simultaneous machining of several workpieces arranged in parallel, one after the other along the Y axis, for example, when the Y axis is vertical, one above the other. That is, in such a case, each tool carrier can interact with a respective one of the workpieces so that the workpieces are machined simultaneously.

In some embodiments of the disclosure, the drive means for displacing the tool magazine in relation to the tool carrier support between the first position and the second position are arranged to operate with a stroke of less than 500 mm, such as with a stroke of between 250 and 450 mm, such as between 350 and 425 mm. It is preferred that the stroke of the drive means be relatively limited, so as to minimize the downtime for tool changes due to the time of the relative displacement between the tool magazine and the tool carrier. The stroke is preferably the same irrespective of the position of the tool carrier support along the X axis.

In some embodiments of the disclosure, the tool magazine is slidably attached to the tool carrier support so that the drive means for displacing the tool magazine in relation to the tool carrier support cause the tool magazine to slide between the first position and the second position. The tool magazine may, for example, comprise members that are guided by guide rails or guide grooves or similar arranged on the tool carrier support and extending in parallel with the X axis, or the tool carrier support may, for example, comprise members that are guided by guide rails or guide grooves or similar arranged on the tool magazine and extending in parallel with the X axis.

In some embodiments of the disclosure, the tool magazine is slidably attached to a side of the tool carrier support that faces the workpiece support during machining. This arrangement may be preferred as it facilitates the positioning of the tool magazine in front of the at least one tool carrier, facing the end of the tool carrier that carries the tool, for example, a chuck end of the tool carrier. This can serve to facilitate the tool change operation.

In some embodiments of the disclosure, the drive means for displacing the tool magazine in relation to the tool carrier support comprise an electric motor and a ball screw mechanism, or an electric motor and a rack and pinion mechanism. Other options are, for example, hydraulic or pneumatic drive means.

In some embodiments of the disclosure, the tool carrier is supported on the tool carrier support so that is displaceable in relation to the tool carrier support in parallel with a Z axis perpendicular to the X axis. The movement in parallel with the Z axis can be useful for, for example, bringing the tool carried by the tool carrier into contact with the respective workpiece for machining, or withdrawing it from the workpiece, or for moving the tool carrier towards and away from the tool magazine during a tool change operation, as part of a procedure for coupling and decoupling between a tool and the tool carrier.

In some embodiments of the disclosure, the tool carrier is supported on the tool carrier support so that is displaceable in relation to the tool carrier support in parallel with a Y axis perpendicular to the X axis and to the Z axis. Thus, typically, movement of the tool carrier in parallel with the X and Y axes serves to bring the tool into the right position in the X-Y plane for interacting with the workpiece at a desired position, whereas the movement in parallel with the Z axis serves to bring to tool into contact with the workpiece or away from the workpiece, or to move the tool carrier towards and away from the tool magazine during a tool change operation. In many embodiments, the X and Z axes are horizontal axes and the Y axis is a vertical axis.

In some embodiments of the disclosure, the tool magazine comprises a housing that at least partially encloses a tool support system including tool grippers, the tool grippers being displaceable to and away from a tool change position within the tool magazine for interaction with the tool carrier, wherein the housing comprises at least one opening in correspondence with the tool change position so that a first tool carried by the tool carrier can be brought into contact with a tool gripper and so that a second tool supported in another tool gripper can become coupled to the tool carrier and withdrawn from the other tool gripper during a tool change operation. Due to the small distance between the tool carrier and the tool magazine, the housing can be useful for preventing material removed from the workpieces during machining to reach sensitive parts of the tool magazine, such as the tool grippers and the means involved with the displacement of the tool grippers within the tool magazine, thereby minimizing the risk of jamming. The opening or openings serve to provide the necessary access to the tool grippers, so that a tool carrier can deposit a tool in a tool gripper and withdraw a tool from another tool gripper during a tool change operation. The tool grippers can be configured in any suitable way that is compatible with automatic tool change operations, for example, in the form of elastic clamps that can serve to receive a tool and grip the tool, and also allow a tool to be withdrawn by a tool carrier, for example, by a relative displacement along the X axis between the tool carrier and the tool gripper and tool magazine. The tool grippers may, for example, being arranged on a rotary belt or similar supported on wheels or pinions or similar, as known in the art, for example, forming a loop of tool grippers within the housing of the tool magazine. The tool magazine optionally comprises at least one shutter for selectively closing the at least one opening. As the tool magazine will be positioned relatively close to the tool carrier during machining, it may be preferred that some kind of shutter be available so as to allow for closure of the at least one opening, so as to prevent material removed from the workpieces, such as metal chips, to enter the tool magazine. Thereby, the risk of jamming of the tool magazine is reduced.

In some embodiments of the disclosure, the tool magazine comprises a plurality of tool grippers configured to engage respective tools, each of said plurality of tool grippers being selectively displaceable to a tool change position within the tool magazine. Each one of said plurality of tool grippers can be configured so that when it is in a tool change position, it can be caused to engage a tool held by a respective tool carrier due to movement of the tool magazine to the second position, and it can be caused to release a tool held by a respective tool carrier due to movement of the tool magazine (12) from the second position.

That is, in these embodiments, the movement of the tool magazine is what brings the tool gripper into engagement with the tool, or what releases the tool from engagement with the tool gripper. That is, with the tool carrier correctly positioned along the Z axis for a tool change operation and the tool magazine moving towards the second position, the tool gripper can enter into engagement with the tool held by the tool carrier (typically, at the end of the stroke of the tool magazine towards the second position). Analogously, when the tool gripper engages a tool held by a tool carrier, for example, at the end of a tool change, movement of the tool magazine away from the second position towards the first position will cause the tool gripper to release the tool. In this way, the entire tool change operation can be carried out merely by the displacement of the tool grippers within the tool magazine (bringing a tool received from a tool carrier away from the tool change position and brining a new tool to the tool change position), by the displacement of the tool magazine from the first position to the second position and back to the first position, by movement of the respective tool carrier along the Z axis (backwards—that is, away from the tool magazine—for releasing a tool previously engaged by the tool carrier, and forwards for engaging a new tool to be coupled to the tool carrier) and by the necessary operation of the tool retention means (such as a clutch) of the tool carrier. In particular, this arrangement allows for a tool change without any additional means, in particular, without any dedicated tool change device. For example, it is known in the art to use some kind of robotic arm or similar to transfer a tool between a tool carrier and a tool magazine. The need for such an arrangement can be avoided by means of the tool magazine and tool grippers as described above. The tool grippers can for example have any suitable configuration that allows them to engage and release a tool held by a tool carrier due to movement of the tool gripper in parallel with the X axis. For example, the tool grippers can be elastically deformable devices configured to engage a tool by snap-fit or similar. The tool grippers may incorporate spring means biasing the tool grippers towards a gripping configuration, or they may be made up of an elastically deformable body shaped so as to be able to engage a tool and to release it. For example, the tool grippers may have an opening for receiving a tool that faces along the X axis when the tool gripper is in the tool change position within the tool magazine.

When the tool assembly comprises a plurality of tool carriers arranged along the Y axis, the tools held by the different tool carriers can be changed simultaneously, each tool carrier interacting with a respective first tool gripper at a respective tool change position within the tool magazine and which receives a tool from the tool carrier, and subsequently interacting with a respective second tool gripper at the respective tool change position and which delivers a tool to the respective tool carrier, as described above.

In some embodiments of the disclosure, the workpiece support is arranged for supporting at least one workpiece and for pivoting the at least one workpiece around an axis parallel with the X axis. This pivotation can be useful for, for example, shifting the workpiece from a position for loading and unloading the workpieces onto and from the workpiece support, respectively, and also for adapting the orientation of the workpiece in relation to the respective tool carrier or tool carriers so as to set a desired angle of attack between a tool and the workpiece, without any need for pivotation of the tool carrier or of the tool carrier support.

In some embodiments of the disclosure, the workpiece support is arranged for supporting at least two workpieces so that they extend in parallel, and wherein the tool carrier support supports at least two tool carriers arranged for simultaneous machining of a respective one of the at least two workpieces. Thereby, several workpieces can be machined simultaneously, enhancing productivity. The two or more, such as three or four, tool carriers can be arranged to move jointly in parallel with the X axis due to the movement of the tool carrier support along the X axis, and they can be arranged on a common sledge member or similar so as to move jointly along a Y axis perpendicular to the X axis, such as a vertical Y axis, the sledge member being arranged to, for example, slide along a side of the tool carrier support. These movements along the X and Y axis can serve to position the tool carriers in the X-Y plane for machining at the appropriate positions of the workpieces. The tool carriers may be arranged to be driven independently in parallel with a Z axis perpendicular to the X and Y axes, and which may be parallel with the axes of rotation of the tools. Thus, each tool carrier may be provided with its own drive means for displacement "forward" and "backward" along the Z axis, that is, towards and away from the workpiece support. Thus, one of the tool carriers may be involved with a machining operation while another tool carrier may be idle, if this is desired. However, of course, all tool carriers can also be carrying out machining operations simultaneously.

In some embodiments of the disclosure, the machine tool comprises at least two tool assemblies, each tool assembly comprising a tool carrier support and a tool magazine. Thus, a workpiece can be machined simultaneously by tools supported by two different tool assemblies, and one tool assembly can be carrying out machining of the workpiece while another tool assembly is performing a tool change operation, or down for maintenance, etc. The tool carriers of the two tool assemblies that interact with the same workpiece can carry different kinds of tools. These possibilities serve to enhance productivity, reliability and efficiency. Also, if one of the two tool assemblies suffers a failure, workpieces may sommetimes still be completely machined using the other tool assembly, thereby preventing a complete interruption of the production of machined workpieces.

Another aspect of the disclosure relates to a method of operating a machine tool as described above. The method comprises:

> displacing the at least one tool assembly, including the tool carrier support and the tool magazine, in parallel with the X axis;
>
> carrying out at least one machining operation on a workpiece with a first tool carried by the tool carrier;
>
> displacing the tool carrier away from the workpiece;
>
> activating the drive means so as to displace the tool magazine from the first position to the second position;
>
> carrying out a tool change by releasing a first tool carried by the tool carrier in the tool magazine, and by subsequently coupling a second tool, supported by a tool gripper within the tool magazine, to the tool carrier (this operation can be carried out by, for example, a series of movements of the tool carrier in parallel with the Z axis and by operating a chuck or similar of the tool carrier to release the first tool and to engage the second tool so that it becomes coupled to the tool carrier);
>
> activating the drive means so as to displace the tool magazine from the second position to the first position;
>
> carrying out at least one machining operation on the workpiece with the second tool.

In some embodiments of the disclosure, the method comprises:

> causing the first tool carried by the tool carrier to become engaged by a tool gripper of the tool magazine during displacement of the tool magazine from the first position to the second position (that is, the tool gripper may enter into contact with the tool to engage to tool due to the movement of the tool magazine in parallel with the X axis, towards the second position);
>
> displacing the tool carrier in parallel with a Z axis in a direction away from the tool magazine, so as to release the first tool from the tool carrier;
>
> positioning the second tool held by a tool gripper of the tool magazine in front of the tool carrier;
>
> displacing the tool carrier in parallel with a Z axis in a direction towards the tool magazine, so as to engage the second tool;
>
> causing the second tool to become released from the tool gripper by displacing the tool magazine from the second position towards the first position. Of course, the release and engagement of the tools by the tool carrier may involve corresponding operations of a chuck or similar forming part of the tool carrier.

In some embodiments of the disclosure, the method comprises simultaneously machining of a plurality of workpieces, each workpiece being an elongate workpiece extending in parallel with the X axis, wherein the workpieces are arranged in parallel in the workpiece support, and wherein the method optionally comprises pivoting the workpieces around an axis parallel with the X axis.

In some embodiments of the disclosure, the tool carrier support may be displaced along the X axis during at least part of a tool change operation, in order to position the tool carrier (or tool carriers) in a position along the X axis appropriate for prompt continuation of the machining after the tool change operation, that is, continued machining of the workpiece (or workpieces) with the new tool (or tools).

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as an example of how the disclosure can be carried out. The drawings comprise the following figures.

DETAILED DESCRIPTION OF THE DRAWINGS

FIGS. 1-8 illustrate a first embodiment of the disclosure, in which the machine tool comprises a workpiece support 1000 for supporting elongate workpieces 2001, 2002, 2003 extending in parallel with an X axis of the machine tool. The workpieces can, for example, be metal beams or profiles having a length of more than 1 meter, such as a length of more than 1.5, 2 or 3 meters.

Figure 1:
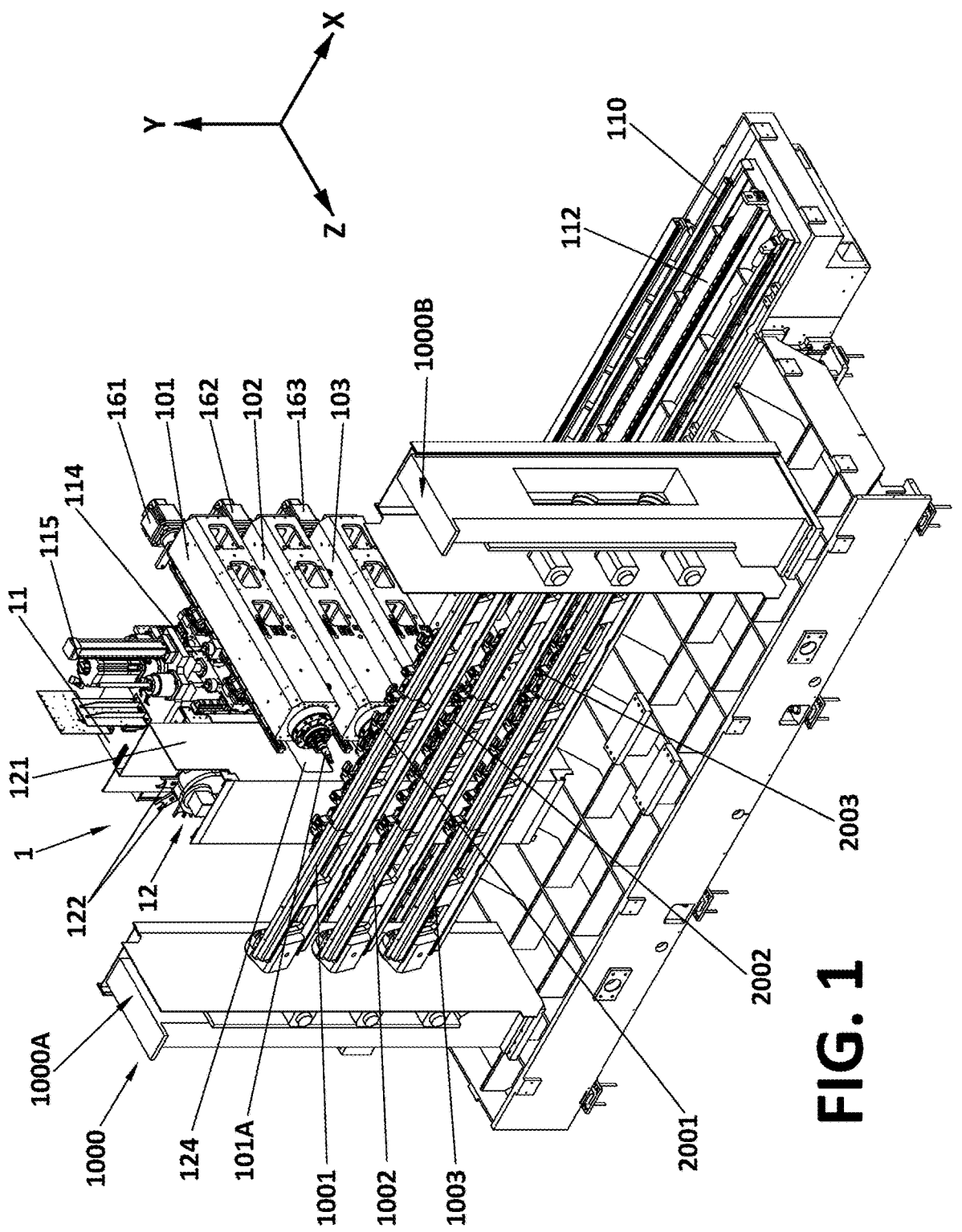
FIG. 1-8 are schematic perspective views of a machine tool according to a first embodiment of the disclosure, at different moments of its operation, including a tool change.

The workpiece support includes, for each workpiece, an elongate support member 1001, 1002, 1003 to which the respective workpiece can be clamped. Each support member is arranged so that it can pivot around an axis parallel with the X axis, for the purpose of setting a suitable angle of attack between workpiece and tool (for example, in the case of the uppermost workpiece 2001, between that workpiece and the tool 101A shown in FIG. 1), and for transferring the workpiece from a position for loading and unloading (for example, a position in which the workpiece faces away from the tool carrier) to a position for machining the workpiece, in which the workpiece faces the respective tool so that the tool can carry out machining operations on the workpiece. The elongate support members 1001, 1002, 1003 are arranged between two vertical columns 1000A, 1000B. As shown in FIG. 1, the elongate support members 1001, 1002 and 1003 are arranged in parallel, one after the other along the vertical Y axis of the machine tool, that is, one above the other.

The machine tool further includes a tool assembly 1 which is displaceable in parallel with the X axis, guided by guide means, such as guide rails 110 or similar, extending in parallel with the X axis. That is, the tool assembly 1 is displaceable in parallel with the elongate support members 1001, 1002 and 1003. The tool assembly may be driven by any suitable drive means, such as by electric motors. For example, the tool assembly 1 may be driven by one or more electric motors mounted on the tool assembly for driving it in parallel with the X axis, for example, by means of one or more pinions driven by the respective motor interacting with a rack. That is, the tool assembly may be controllably displaceable along the X axis by an electrically operated pinion-rack drive. In other embodiments, other kinds of drive means may be used. The use of two motors per tool assembly may be preferred in order to reduce the play between pinions and rack. The motors are not shown in FIG. 1, but they may be arranged similarly to the motors 111 of the embodiment of FIG. 9, which are arranged to interact with the rack 112.

The tool assembly comprises a tool carrier support 11 and a tool magazine 12. The tool carrier support is, in this embodiment, a column or carriage to which the motors (such as the motors 111 of the embodiment of FIG. 9) are attached and which is supported on the machine bed and driven along the X axis as described above. The tool magazine 12 is attached to the column or tool carrier support 11 as will be described in more detail below. The tool carrier support 11 has a side facing in the X axis direction (that is, the X axis is orthogonal to this side of the column) on which three tool carriers 101, 102, 103 are supported, which carry respective tools (only the tool 101A of the uppermost tool carrier 101 is shown in FIG. 1) for machining of the workpieces. Each one of the tool carriers 101, 102, 103 is intended to carry out machining operations on a respective one of the workpieces 2001, 2002, 2003. Each tool carrier includes a spindle for rotating the respective tool, as known in the art. The tool carriers are mounted on a sledge member 114 which is displaceable in parallel with the vertical Y axis, driven by corresponding drive means 115. The drive means may comprise one or more electric motors, which may operate, for example, a ball screw mechanism or any other suitable mechanism, such as a pinion-rack mechanism.

In the illustrated embodiment, each tool carrier 101, 102 and 103 is displaceable in parallel with a horizontal Z axis, and the tools 101A are rotated around axes parallel with the Z axis. In this embodiment, the displacement of the tool carriers in parallel with the Z axis is produced by corresponding electric motors 161, 162, 163 which, in this embodiment, drive respective ball screw mechanisms for displacing the respective tool carrier in parallel with the Z axis. However, obviously, any other kind of suitable drive system may be used. The movement in the Z direction can be used to bring the tool or tools carried by the respective tool carrier 101, 102, 103 into contact with the respective workpiece 2001, 2002, 2003 and away from the workpiece. In this embodiment, the movement of each tool carrier in parallel with the Z axis is independent of the movement of the other tool carriers in parallel with the Z axis: as shown in FIG. 1, each tool carrier has its own drive means 161, 162, 163. The movement in the Z direction is also relevant for the tool change operation, as will be described below.

The tool magazine 12 is slidably attached to another side of the tool carrier support 11, namely, to a "front" side of the tool carrier support 11 facing in the Z direction, namely, facing the workpiece support 1000. The tool magazine comprises a housing 121 including a plurality of openings 123 (see for example FIG. 2) normally closed by shutters 124 (see for example FIG. 1) to prevent chips or other debris produced during machining from entering the housing. Within the housing 121, the workpiece magazine 12 comprises a plurality of tool grippers 122 for gripping respective tools, that is, for supporting the tools within the tool magazine. The tool grippers are arranged on a belt or similar driven by wheels or pinions or similar, as known in the art, so that a selected tool gripper can be displaced to a tool change position in correspondence with one of the openings 123, for engaging a tool held by a tool carrier or for positioning a tool supported by the tool gripper so that it can be picked up by a tool carrier. The tool grippers may be embodied as elastic clamp devices, such as substantially C- or U-shaped clamps, so that their elastic performance serves to receive and engage and reliably hold a tool inserted into the tool gripper due to movement of the tool gripper in relation to the tool carrier, and to allow a tool engaged by the tool gripper to be released from the tool gripper due to movement of the tool magazine away from a tool carrier engaging the tool.

Figure 9:
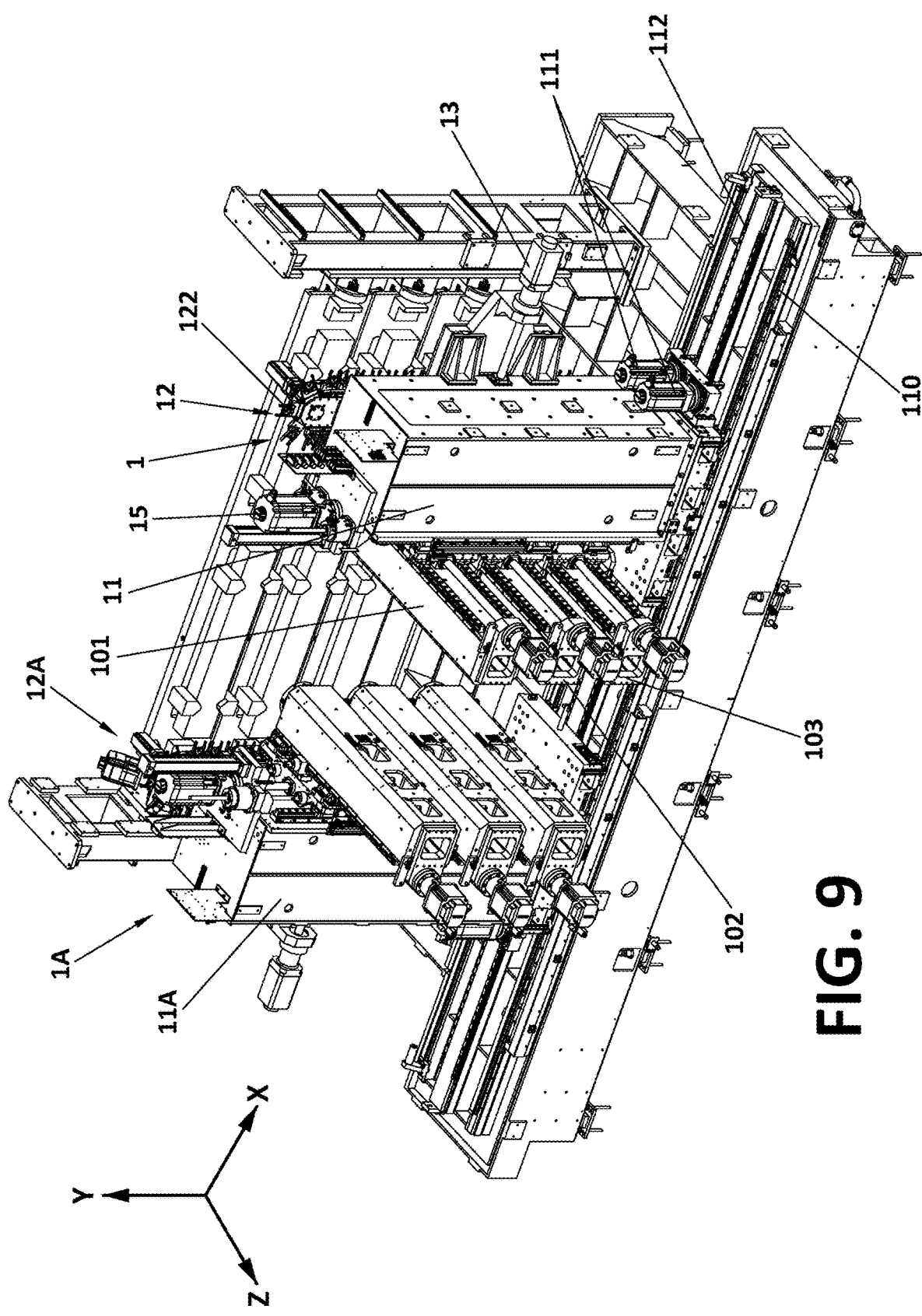
FIGS. 9 and 10 are perspective views of a machine tool according to another embodiment of the disclosure.
Figure 10:
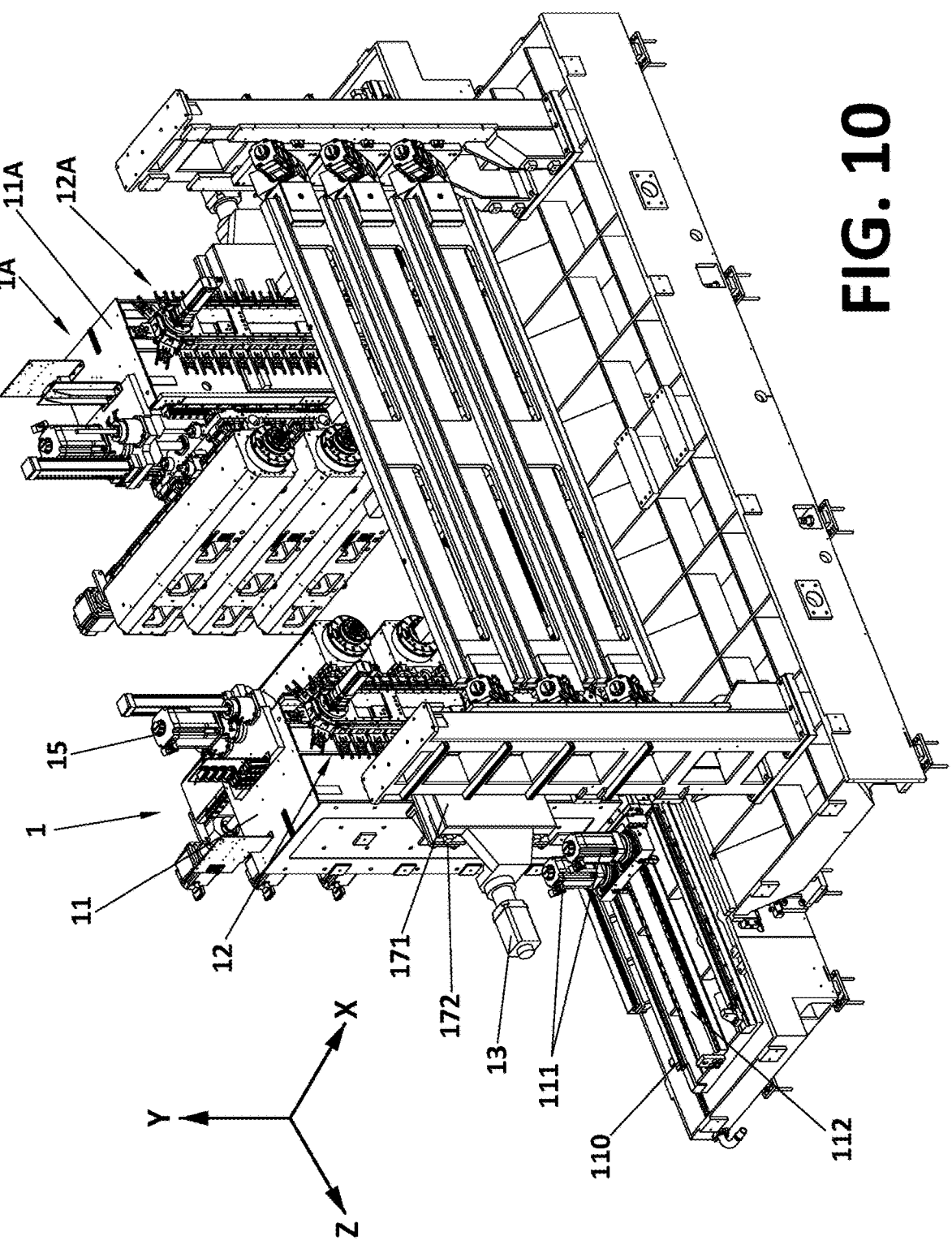

The tool magazine 12 generally moves along the X axis together with the tool carrier support 11 to which the tool magazine 12 is attached. However, the tool magazine 12 is additionally displaceable in parallel with the X axis in relation to the tool carrier support 11, that is, the tool magazine 12 is capable of moving also in relation to the tool carrier support 11. More specifically, in this embodiment the tool magazine 12 is slidably attached to the tool carrier support 11 so that it can be displaced relative to the tool carrier support 11, driven by drive means 13 (not shown in FIG. 1; however, they can be arranged as shown in FIGS. 9 and 10) which in this embodiment are implemented as an electric motor driving a ball screw mechanism. Thus, the tool magazine 12 can be displaced by the drive means 13 relative to the tool carrier support 11, between a first position (shown in, for example, FIG. 1) in which the tool magazine 12 does not face the tool carriers 101, 102, 103, and a second position (shown in, for example, FIG. 4) in which the tool magazine 12 faces the tool carriers 101, 102 and 103, in order to allow for a tool change. The tool magazine 12 can be attached to a sledge member 171 which is slidable arranged on a support member 172 forming part of the tool carrier support, as in the embodiment schematically illustrated in FIG. 10. The stroke of the tool magazine between the first and the second position is in this embodiment in the order of less than 500 mm, such as between 250 and 450 mm, such as between 350 and 425 mm.

FIG. 1 illustrates the machine tool according to the first embodiment of the disclosure at a moment at which the machine tool has finished a first sequence of machining operations on the three workpieces 2001, 2002, 2003, using a set of first tools 101A, one of which is shown in FIG. 1. Here, the tool carriers 101, 102 and 103 are still facing the workpieces, and the tool magazine 12 is in its first position (relative to the tool carrier support 11), that is, away from the tool carriers 101, 102, 103, that is, not facing them.

Figure 2:
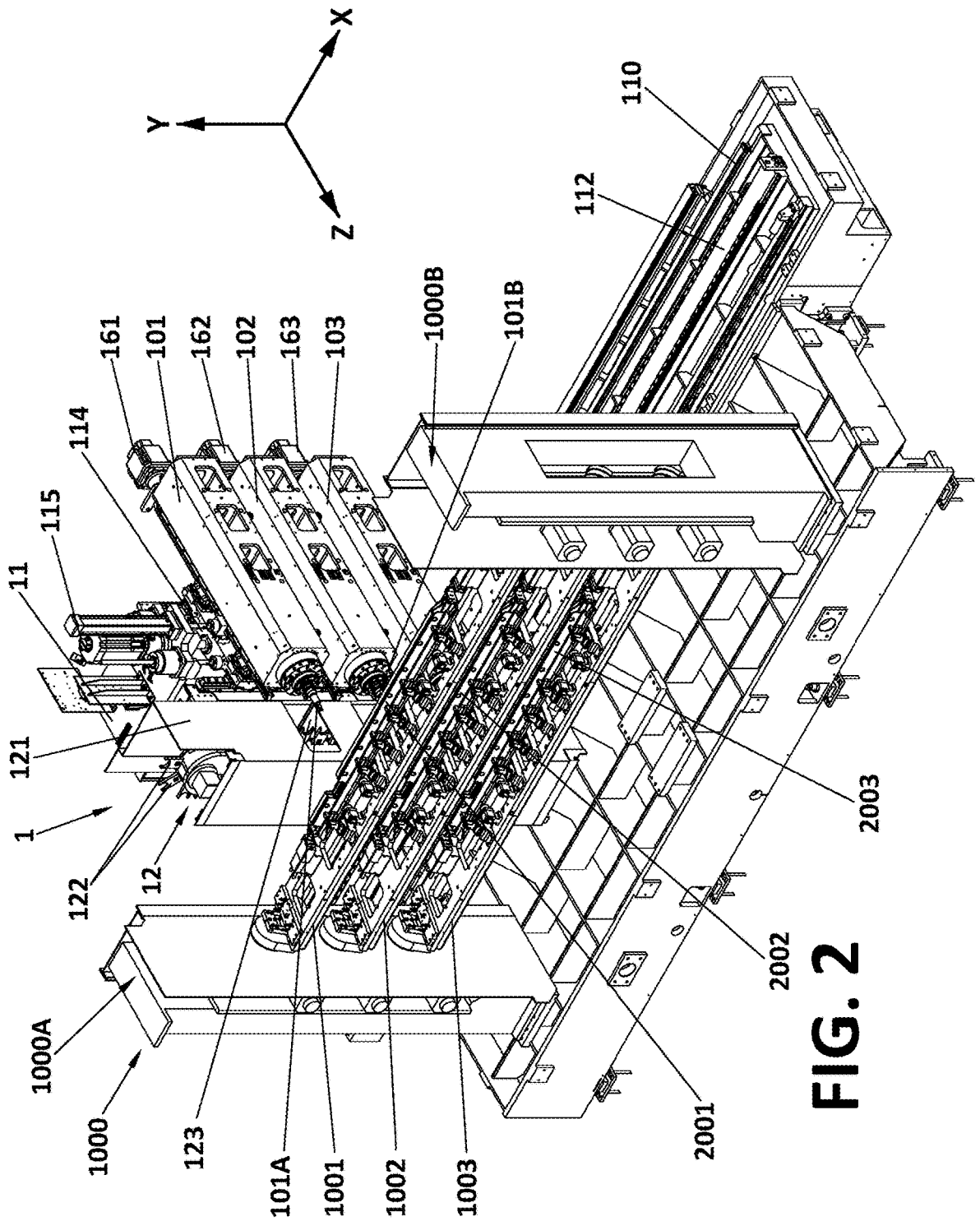

FIG. 2 illustrates a subsequent stage of the operation, namely, the beginning of a tool change operation. Here, the tool carriers 101, 102, 103 are being retracted along the Z axis, away from the workpieces 2001, 2002, 2003, so as to allow the tool magazine 12 to move to its second position. In their position as per FIG. 2, the tool carriers 101, 102 and 103 are in a position along the Z axis in which they no longer block the tool magazine 12 from moving to its second position. In FIG. 2, the shutters 124 (shown in FIG. 1) that serve to prevent debris such as chips from entering the tool magazine 12 during machining have been opened, thereby providing access to the interior of the tool magazine via the openings 123 in the housing. There is one such opening for each tool carrier 101, 102, 103. In the illustrated embodiment, the openings extend along at least part of two sides of the housing.

Figure 3:
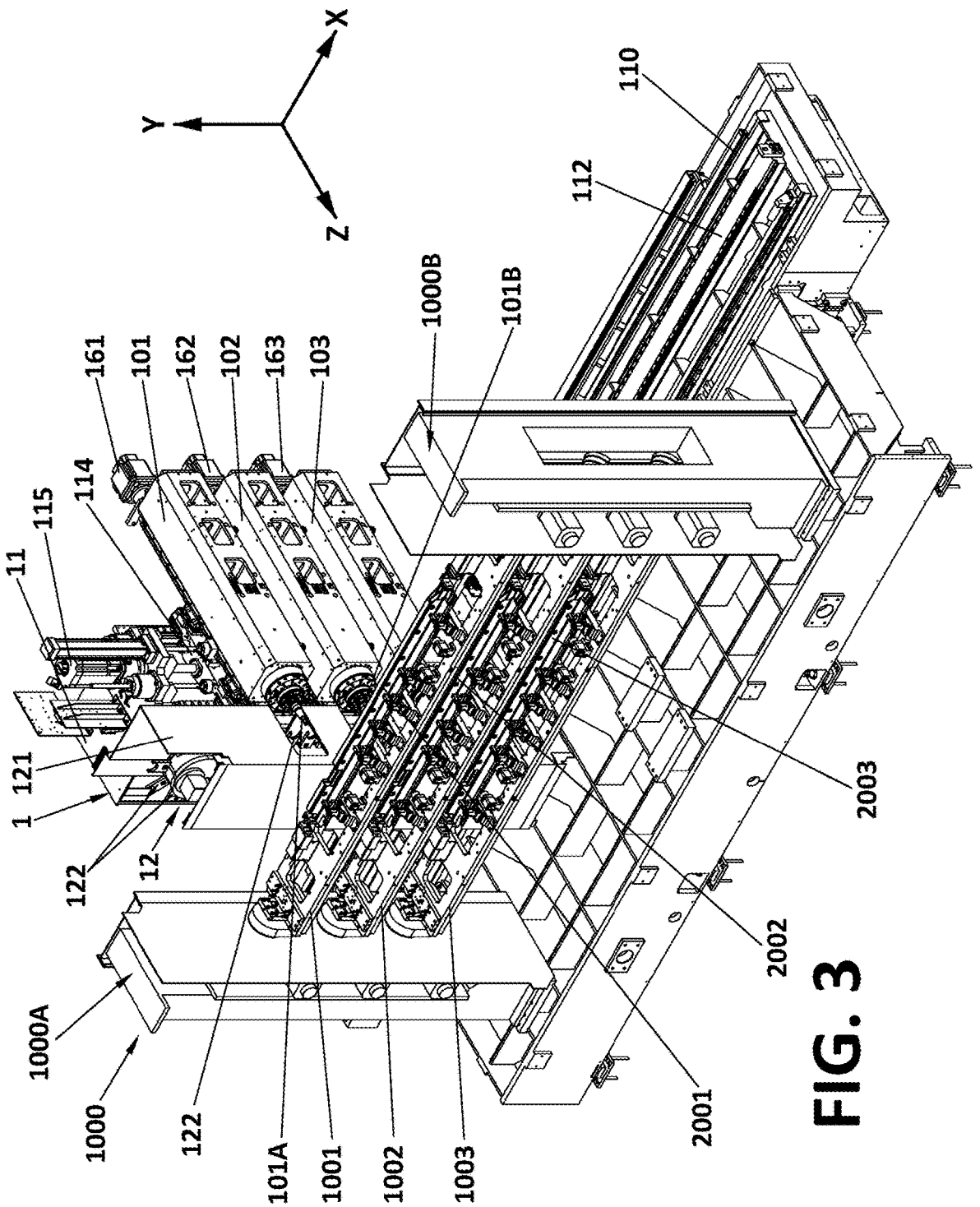

In FIG. 3 the tool magazine 12 has initiated its movement towards the second position. As can be readily understood from FIG. 3, here the first tools 101A and 102A approach respective ones of the tool grippers 122. Additionally, the tool carrier support 11 has moved along the X axis, towards a position along the X axis where the next machining operations are intended to take place. This movement of the cool carrier support 11 along the X axis can be carried out at the same tome as the relative movement between the tool magazine 12 and the tool carriers 101, 102, 103 in parallel with the X axis, thereby contributing to reduced cycle times.

Figure 4:
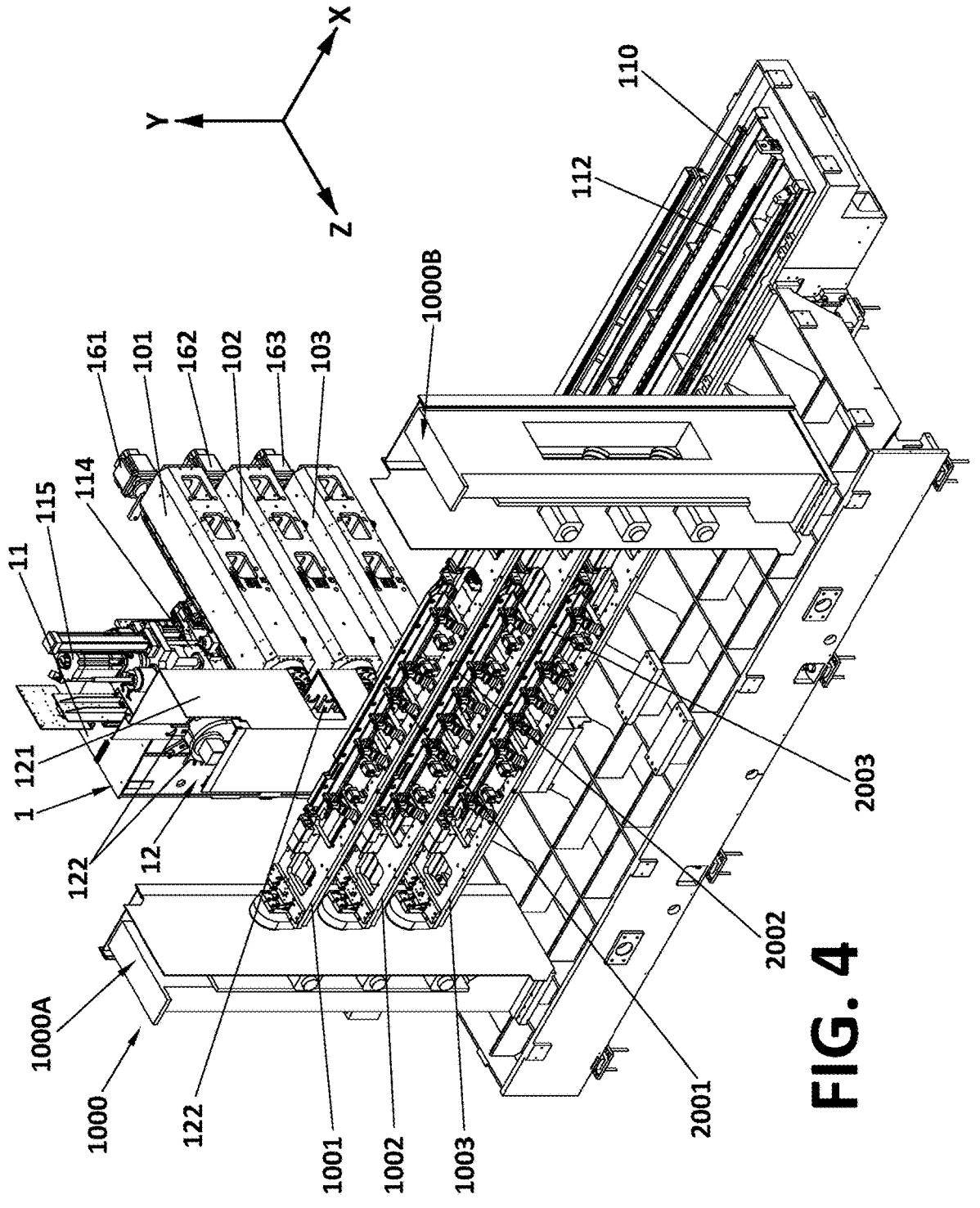

In FIG. 4, the tool magazine 12 has reached its second position and now faces the tool carriers 101, 102 and 103, and the first tools 101A, 102A have been inserted into the respective tool grippers, so that the respective tool grippers (embodied as elastically deformable clamps) engage the workpieces. Subsequently, the tool carriers 101, 102, 103 are displaced backwards along the Z axis, after releasing the first tools 101A, 102A.

Figure 5:
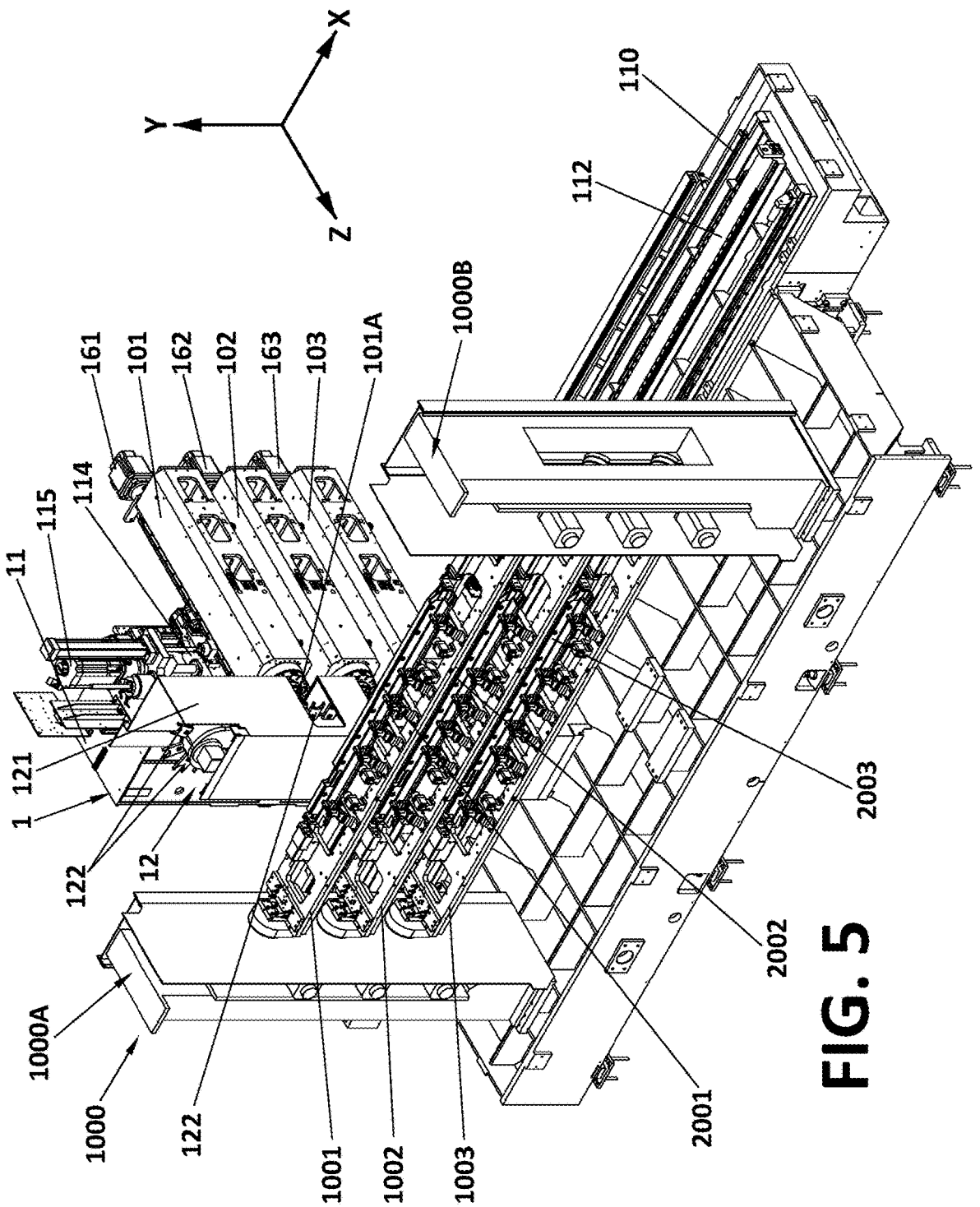

In FIG. 5, the first tool 101A, now supported by the respective tool gripper, is being displaced downwards, away from the position in the X-Y plane which matches the position of the clutch of the tool carrier 101. The same is happening with the first tools held by the other tool carriers 102, 103. At the same time, a set of second tools (not shown in FIG. 5) is being displaced within the tool magazine due to rotation of the belt, so that the second tools will face the chucks of the tool carriers 101, 102, 103. Then, the tool carriers can move forwards so that their chucks engage the new tools.

Figure 6:
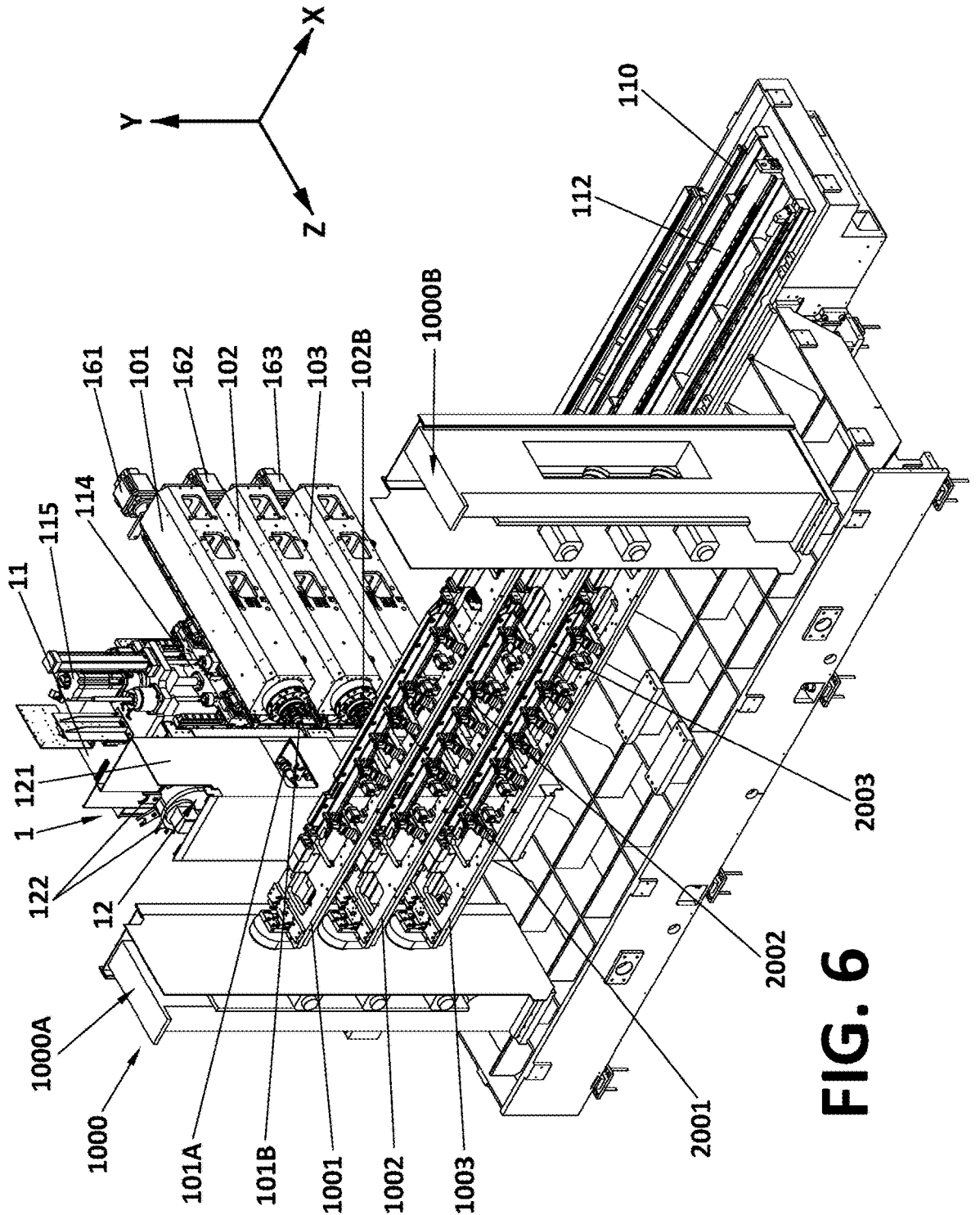

In FIG. 6 the tool change operation has been completed and the tool magazine 12 has been shifted back to its first position. During this movement along the X axis, the set of second tools (including tools 101B, 102B shown in FIG. 6) is released from the respective tool grippers due to the movement of the tool magazine away from the second position.

Figure 7:
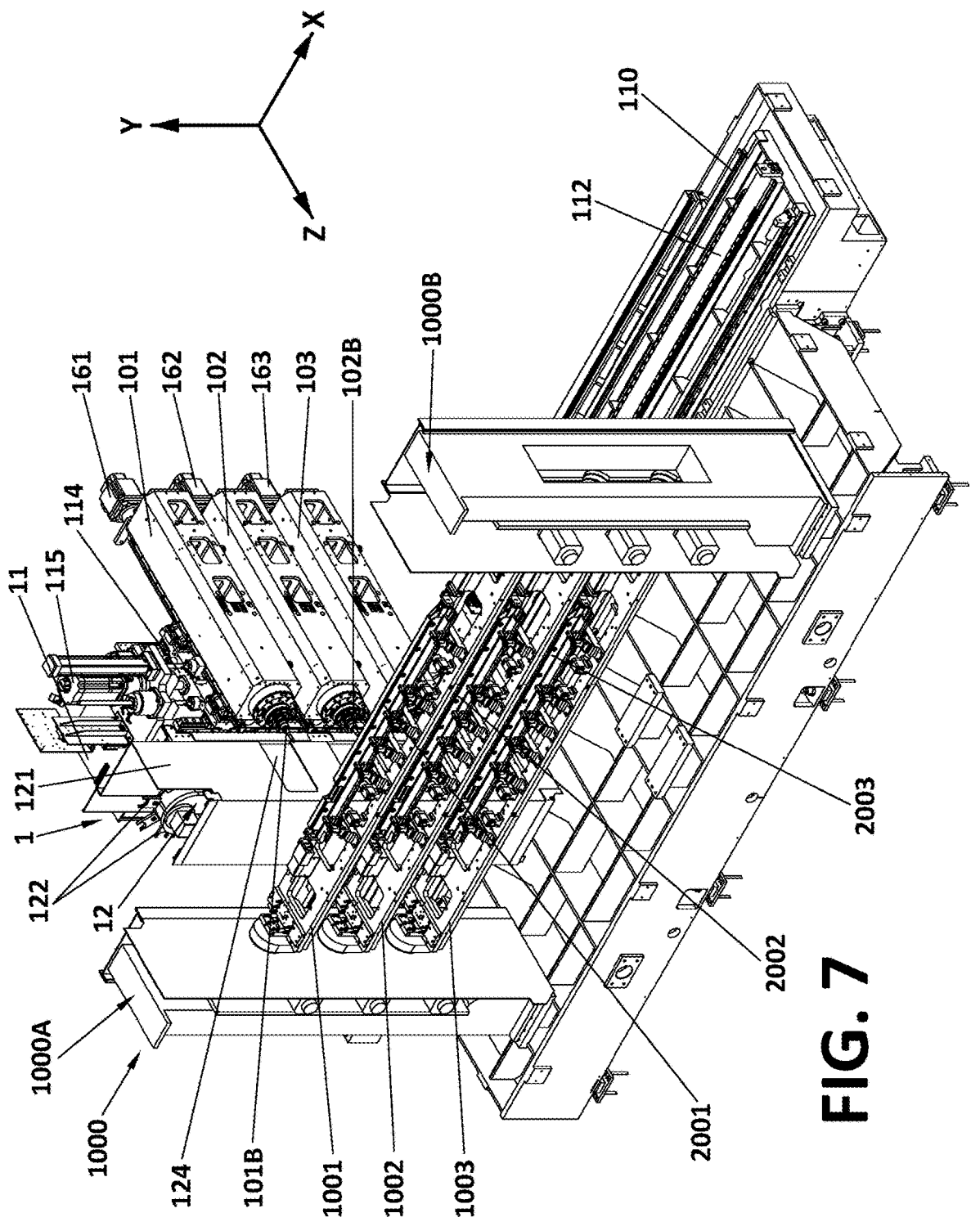

In FIG. 7 the shutters 124 have been closed again. The machine tool is now ready for initiating a new sequence of machining operations on the workpieces 2001, 2002, 2003, using the new tools 101B, 102B.

Figure 8:
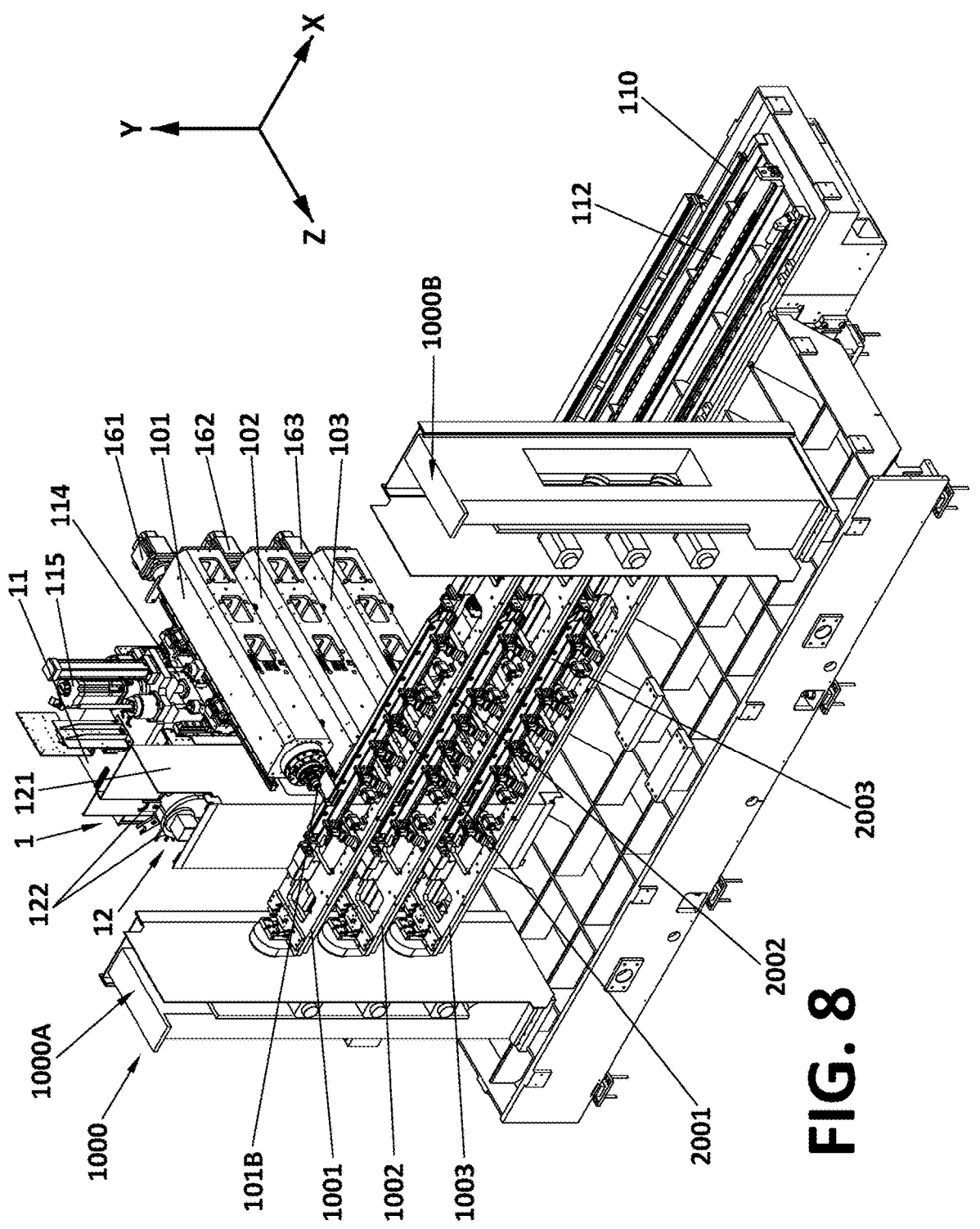

In FIG. 8, the tool carriers 101, 102, 103 are moving forward along the Z axis, approaching the workpieces for machining.

FIGS. 9 and 10 show a second embodiment of the disclosure (elements that correspond to those of the first embodiment are indicated using the same reference numbers), which differs from the first embodiment inter alia due to the presence of a second tool assembly 1A comprising a second tool carrier support 11A and a second tool magazine 12A. What has been explained regarding the tool assembly of the first embodiment is also applicable to the second tool assembly.

In this text, the term "comprises" and its derivations (such as "comprising", etc.) should not be understood in an excluding sense, that is, these terms should not be interpreted as excluding the possibility that what is described and defined may include further elements, steps, etc.

The disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The invention claimed is:

1. A machine tool comprising:
   a workpiece support for supporting at least two workpieces for allowing machining of the workpieces; and
   a tool assembly comprising a tool carrier support and a tool magazine, the tool assembly being displaceable in parallel with an X axis;
   wherein the tool carrier support supports a tool carrier, the tool carrier being configured for carrying and driving a tool configured for machining at least one of the at least two workpieces supported by the workpiece support, wherein the tool carrier is supported on the tool carrier support for movement with the tool carrier support in parallel with the X axis;
   wherein the tool magazine of the tool assembly is configured for supporting a plurality of tools;
   wherein the tool magazine is attached to the tool carrier support for movement with the tool carrier support in parallel with the X axis;
   wherein the tool assembly comprises drive means for displacing the tool magazine in relation to the tool carrier support, between a first position in which the tool magazine is not disposed facing the tool carrier, and a second position in which the tool magazine is disposed facing the tool carrier, for allowing replacement of a tool carried by the tool carrier, by another tool supported by the tool magazine;

wherein the tool carrier is supported on the tool carrier support so that the tool carrier is displaceable in relation to the tool carrier support in parallel with a Z axis perpendicular to the X axis;

and wherein the workpiece support is arranged for supporting the at least two workpieces so that the at least two workpieces extend in parallel with the X axis, and so that the workpieces are arranged one after the other along an axis parallel with the Y axis, the Y axis being perpendicular to the X axis and to the Z axis, and wherein the tool carrier support supports at least one further tool carrier, the tool carriers being arranged for simultaneous machining of a respective one of the at least two workpieces, the tool carriers being arranged one after the other along an axis parallel with the Y axis.

2. The machine tool according to claim 1, wherein the drive means are drive means for displacing the tool magazine in parallel with the X axis in relation to the tool carrier support, between the first position and the second position.

3. The machine tool according to claim 1, wherein the drive means are arranged to operate with a stroke of less than 500 mm.

4. The machine tool according to claim 1, wherein the tool magazine is slidably attached to the tool carrier support so that the drive means cause the tool magazine to slide between the first position and the second position.

5. The machine tool according to claim 4, wherein the tool magazine is slidably attached to a side of the tool carrier support that faces the workpiece support during machining.

6. The machine tool according to claim 1, wherein the tool magazine is slidably attached to the tool carrier support so that the drive means cause the tool magazine to slide in parallel with the X axis, between the first position and the second position.

7. The machine tool according to claim 1, wherein the drive means comprise an electric motor and a ball screw mechanism, or an electric motor and a rack and pinion mechanism.

8. The machine tool according to claim 1, wherein the tool carrier is supported on the tool carrier support so that the tool carrier is displaceable in relation to the tool carrier support in parallel with a Y axis perpendicular to the X axis and to the Z axis.

9. The machine tool according to claim 1, wherein the tool magazine comprises a housing that at least partially encloses a tool support system including tool grippers, the tool grippers being displaceable to and away from a tool change position within the tool magazine for interaction with the tool carrier, wherein the housing comprises at least one opening in correspondence with the tool change position so that a first tool carried by the tool carrier is configured to be brought into contact with a first tool gripper of the tool grippers and so that a second tool supported in a second tool gripper of the tool grippers is configured to become coupled to the tool carrier and withdrawn from the second tool gripper during a tool change operation.

10. The machine tool according to claim 9, wherein the tool magazine comprises at least one shutter for selectively closing the at least one opening.

11. The machine tool according to claim 1, wherein the tool magazine comprises a plurality of tool grippers configured to engage respective tools, each of said plurality of tool grippers being selectively displaceable to a tool change position within the tool magazine, wherein each one of said plurality of tool grippers is configured so that when each one of said plurality of tool grippers is in a tool change position, each one of said plurality of tool grippers is configured to be caused to engage a first tool held by a respective tool carrier due to movement of the tool magazine to the second position and to be caused to release a second tool held by the respective tool carrier due to movement of the tool magazine from the second position.

12. The machine tool according to claim 1, wherein the Y axis is a vertical axis so that the at least two workpieces are arranged one above the other, and so that the at least two tool carriers are arranged one above the other.

13. The machine tool according to claim 1, wherein the workpiece support is arranged for pivoting each of said at least two workpieces around an axis parallel with the X axis.

14. The machine tool according to claim 1, wherein the workpiece support is arranged for supporting at least two workpieces, each workpiece having a length of more than 2 m.

15. The machine tool according to claim 1, comprising at least two tool assemblies, each tool assembly comprising a tool carrier support and a tool magazine.

16. A method of operating a machine tool according to claim 1, the method including the following steps:

displacing the at least one tool assembly, including the tool carrier support and the tool magazine, in parallel with the X axis, carrying out at least one machining operation on a workpiece with a first tool carried by the tool carrier, displacing the tool carrier away from the workpiece, activating the drive means so as to displace the tool magazine from the first position to the second position, carrying out a tool change by releasing a first tool carried by the tool carrier in the tool magazine, and by subsequently coupling a second tool, supported by a tool gripper within the tool magazine, to the tool carrier, activating the drive means so as to displace the tool magazine from the second position to the first position, and carrying out at least one machining operation on the workpiece with the second tool.

17. The method of claim 16, further including the steps of:

causing the first tool carried by the tool carrier to become engaged by a tool gripper of the tool magazine during displacement of the tool magazine from the first position to the second position, displacing the tool carrier in parallel with a Z axis in a direction away from the tool magazine, so as to release the first tool from the tool carrier, positioning the second tool held by a tool gripper of the tool magazine in front of the tool carrier, displacing the tool carrier in parallel with a Z axis in a direction towards the tool magazine, so as to engage the second tool, and causing the second tool to become released from the tool gripper by displacing the tool magazine from the second position towards the first position.

18. The method of claim 16, wherein the method comprises simultaneously machining of a plurality of workpieces, each workpiece being an elongate workpiece extending in parallel with the X axis, wherein the plurality of workpieces are arranged in parallel in the workpiece support, and wherein the method optionally comprises pivoting the plurality of workpieces around an axis parallel with the X axis.

19. The method according to claim 16, wherein the step of activating the drive means so as to displace the tool magazine from the first position to the second position comprises activating the drive means so as to displace the tool magazine in parallel with the X axis, from the first position to the second position;

and wherein the step of activating the drive means so as to displace the tool magazine from the second position to the first position comprises activating the drive means so as to displace the tool magazine in parallel with the X axis, from the second position to the first position.

20. A machine tool comprising:

a workpiece support for supporting at least one workpiece for allowing machining of the workpiece; and a tool assembly comprising a tool carrier support and a tool magazine, the tool assembly being displaceable in parallel with an X axis;

wherein the tool carrier support supports a tool carrier, the tool carrier being configured for carrying and driving a tool configured for machining a workpiece supported by the workpiece support, wherein the tool carrier is supported on the tool carrier support for movement with the tool carrier support in parallel with the X axis;

wherein the tool magazine of the tool assembly is configured for supporting a plurality of tools;

wherein the tool magazine is attached to the tool carrier support for movement with the tool carrier support in parallel with the X axis;

wherein the tool assembly comprises drive means for displacing the tool magazine in relation to the tool carrier support, between a first position in which the tool magazine is not disposed facing the tool carrier, and a second position in which the tool magazine is disposed facing the tool carrier, for allowing replacement of a tool carried by the tool carrier, by another tool supported by the tool magazine; and wherein the drive means are drive means for displacing the tool magazine in parallel with the X axis in relation to the tool carrier support, between the first position and the second position.

* * * * *